United States Patent
Kikkawa

(10) Patent No.: US 11,232,905 B2
(45) Date of Patent: Jan. 25, 2022

(54) CAPACITOR

(71) Applicant: Panasonic Intellectual Property Management Co., Ltd., Osaka (JP)

(72) Inventor: Hiroyuki Kikkawa, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/877,012

(22) Filed: May 18, 2020

(65) Prior Publication Data

US 2020/0279690 A1    Sep. 3, 2020

Related U.S. Application Data

(63) Continuation of application No. PCT/JP2018/045998, filed on Dec. 14, 2018.

(30) Foreign Application Priority Data

Dec. 28, 2017    (JP) .............................. JP2017-254808

(51) Int. Cl.
*H01G 2/10*        (2006.01)
*H02G 5/02*        (2006.01)

(52) U.S. Cl.
CPC .............. *H01G 2/103* (2013.01); *H02G 5/02* (2013.01)

(58) Field of Classification Search
CPC ............ H01G 2/04; H01G 2/10; H01G 2/103; H01G 2/106; H01G 4/224; H01G 4/236;
(Continued)

(56) References Cited

U.S. PATENT DOCUMENTS 5,587,869 A * 12/1996 Azumi ................... H01G 4/224
                                                             361/301.3
2010/0173194 A1    7/2010 Fujiya et al.
(Continued)

FOREIGN PATENT DOCUMENTS

CN        101743654 A    6/2010
CN        103227295 A    7/2013
(Continued)

OTHER PUBLICATIONS

International Search Report of PCT application No. PCT/JP2018/045998 dated Feb. 26, 2019.
(Continued)

*Primary Examiner* — Timothy J Thompson
*Assistant Examiner* — Guillermo J Egoavil
(74) *Attorney, Agent, or Firm* — McDermott Will and Emery LLP

(57) ABSTRACT

The capacitor includes a capacitor element, a busbar connected to an electrode of the capacitor element, a case housing the capacitor element, and a filling resin filled in the case. The case has a through-hole penetrating from an inner surface of the case to an outer surface of the case. The busbar includes a connection terminal part led out through the through-hole to the outside of the case. The capacitor further includes a sealing member that has a ring shape surrounding the connection terminal part and attaches to the connection terminal part. The sealing member abuts on a first region of the inner surface of the case to seal the through-hole, the first region surrounding the through-hole.

2 Claims, 8 Drawing Sheets

(58) Field of Classification Search
CPC ............ H01G 4/32; H01G 4/38; H01G 9/008; H01G 11/82; H01M 50/15; H01M 50/172; H01M 50/543; H02G 5/02
USPC .............................................. 361/301.1, 500
See application file for complete search history.

(56) References Cited

U.S. PATENT DOCUMENTS

| | | |
|---|---|---|
| 2013/0196229 A1 | 8/2013 | Shiraishi et al. |
| 2014/0168869 A1* | 6/2014 | Jeong ........................ H01G 4/38 |
| | | 361/679.01 |
| 2014/0177131 A1* | 6/2014 | Miura .................... H01G 2/103 |
| | | 361/303 |

FOREIGN PATENT DOCUMENTS

| | | | | |
|---|---|---|---|---|
| JP | 8-148376 | 6/1996 | | |
| JP | 2010-093057 | 4/2010 | | |
| JP | 5208228 B2 * | 6/2013 | ............... | H02K 5/22 |
| JP | 2016-058688 | 4/2016 | | |
| JP | 2016058688 A * | 4/2016 | ............... | H01G 2/04 |

OTHER PUBLICATIONS

English Translation of Chinese Office Action dated Jul. 5, 2021 for the related Chinese Patent Application No. 201880081874.0.

\* cited by examiner

CAPACITOR

RELATED APPLICATIONS

This application is a continuation of the PCT International Application No. PCT/JP2018/045998 filed on Dec. 14, 2018, which claims the benefit of foreign priority of Japanese patent application No. 2017-254808 filed on Dec. 28, 2017, the contents all of which are incorporated herein by reference.

BACKGROUND

1. Technical Field

The present disclosure relates to capacitors.

2. Description of the Related Art

Unexamined Japanese Patent Application No. 2010-093057 discloses a resin-sealed electric component. The resin-sealed electric component has a structure in which an electric element such as a capacitor element is housed in a case. An outside connection terminal connected to the electric element is passed through a through-hole in a side surface of the case to the outside. And the case is filled with a filling resin such as epoxy resin. The filling resin is filled in the case in a molten state, and after the filling, is cured in the case.

In the resin-sealed electric component disclosed in Unexamined Japanese Patent Application No. 2010-093057, there is a possibility that the filling resin in a molten state leaks from a minute gap between the terminal and an inner peripheral surface of the through-hole through which the terminal passes. Hence, in the resin-sealed electric component disclosed in Unexamined Japanese Patent Application No. 2010-093057, a pair of first projection parts extending vertically is formed on both left and right sides of the through-hole on the side surface of the case (case side wall member). A first resin receiving part is formed to connect both lower end portions of the pair of first projection parts along the lower end of the through-hole. When a gap sealing resin is injected from the vicinity of the abutting portion between the upper surface of the terminal inside the case and the inner peripheral surface of the through-hole, the injected gap sealing resin enters a minute gap existing between the terminal and the inner peripheral surface of the through-hole by capillary action, and thus this gap is sealed by the gap sealing resin. After the gap sealing resin is cured, the case is filled with the filling resin.

SUMMARY

A capacitor according to a first aspect of the present disclosure includes a capacitor element, a busbar connected to an electrode of the capacitor element, a case housing the capacitor element, and a filling resin filled in the case. The case has a through-hole penetrating from the inner surface of the case to the outer surface of the case. The busbar includes a connection terminal part led out through the through-hole to an outside of the case. The capacitor further includes a sealing member that has a ring shape surrounding the connection terminal part and attaches to the connection terminal part. The sealing member abuts on a first region of the inner surface of the case to seal the through-hole, the first region surrounding the through-hole.

A capacitor according to a second aspect of the present disclosure includes a capacitor element, a busbar connected to an electrode of the capacitor element, a case housing the capacitor element, and a filling resin filled in the case. The case has a through-hole penetrating from the inner surface of the case to the outer surface of the case. The busbar includes a connection terminal part led out through the through-hole to the outside of the case. The capacitor further includes a first sealing member and a second sealing member. Each of the first sealing member and the second sealing member has a ring shape surrounding the connection terminal part and attaches to the connection terminal part. The first sealing member abuts on a first region of the inner surface of the case to seal the through-hole, the first region surrounding the through-hole. The second sealing member abuts on a second region of the outer surface of the case to seal the through-hole, the second region surrounding the through-hole.

According to the present disclosure, resin leakage from a through-hole of a case through which a connection terminal part of a busbar passes can be easily prevented.

The effects and significance of the present disclosure will be more apparent from the following description of the exemplary embodiment. However, the exemplary embodiment described below is merely an example when embodying the present disclosure, and the present disclosure is not limited to what is described in the following exemplary embodiment.

DETAILED DESCRIPTION OF EMBODIMENT

Figure 1A:
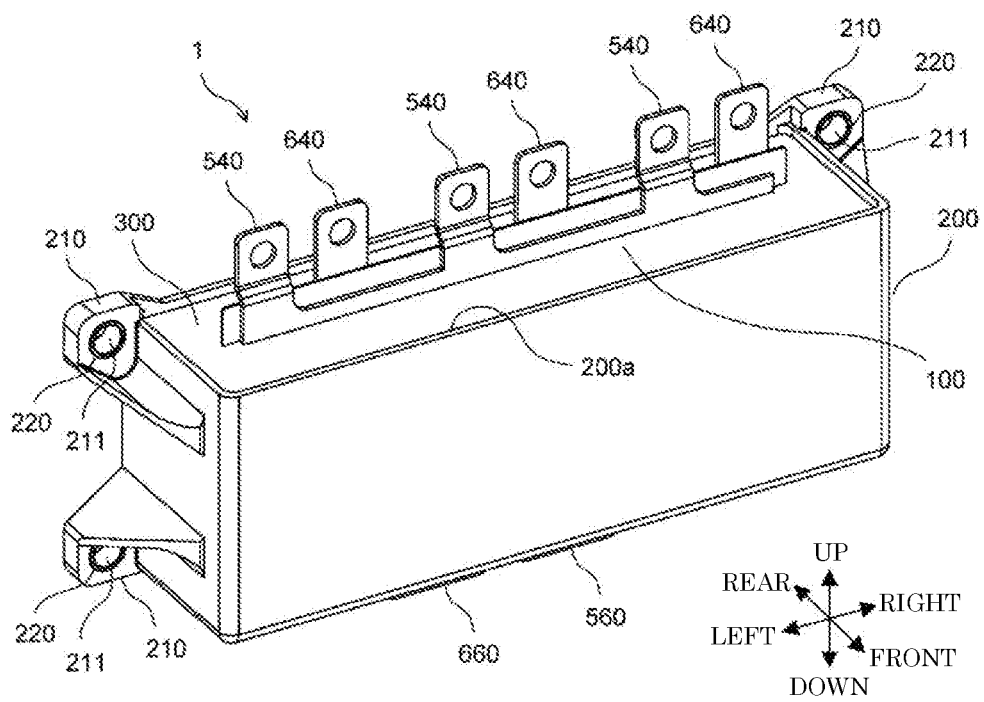
FIG. 1A is a perspective view illustrating a film capacitor according to an exemplary embodiment as viewed from the upper front.

In the resin-sealed electric component disclosed in Unexamined Japanese Patent Application No. 2010-093057, at the time of manufacturing, it is necessary to execute a step of injecting a gap sealing resin into a case and raising a temperature of the injected gap sealing resin for curing before a step of injecting a filling resin into the case and raising a temperature of the injected filling resin for curing. Thus, a number of steps is increased, and the manufacturing is likely to be difficult.

In view of such a problem, the present disclosure provides a capacitor that can easily prevent resin leakage from a through-hole of a case through which a connection terminal part of a busbar passes.

Hereinafter, film capacitor 1 which is an exemplary embodiment of the capacitor of the present disclosure will be described with reference to the drawings. For convenience, front-rear direction, left-right direction, and up-down direction are added to each drawing as appropriate. It should be noted that the directions shown in the drawings merely indicate relative directions of film capacitor 1, and do not indicate absolute directions.

In the present exemplary embodiment, film capacitor 1 corresponds to a "capacitor" described in the claims. Each of first through-hole 230 and second through-hole 240 corresponds to the "through-hole" described in the claims. Further, each of first end surface electrode 410 and second end surface electrode 420 corresponds to an "electrode" described in the claims. Further, each of first busbar 500 and second busbar 600 corresponds to a "busbar" described in the claims. Further, each of first lower connection terminal part 560 and second lower connection terminal part 660 corresponds to a "connection terminal part" described in the claims. Further, sealing member 700 corresponds to a "sealing member" described in the claims. Furthermore, surrounding wall surface 252, 254 corresponds to a "surrounding wall surface" described in the claims.

Meanwhile, the above description is intended only for the purpose of associating the configuration of the claims with the configuration of the exemplary embodiment, and the disclosure in the claims is not limited at all to the configuration of the exemplary embodiment by the association.

Figure 1B:
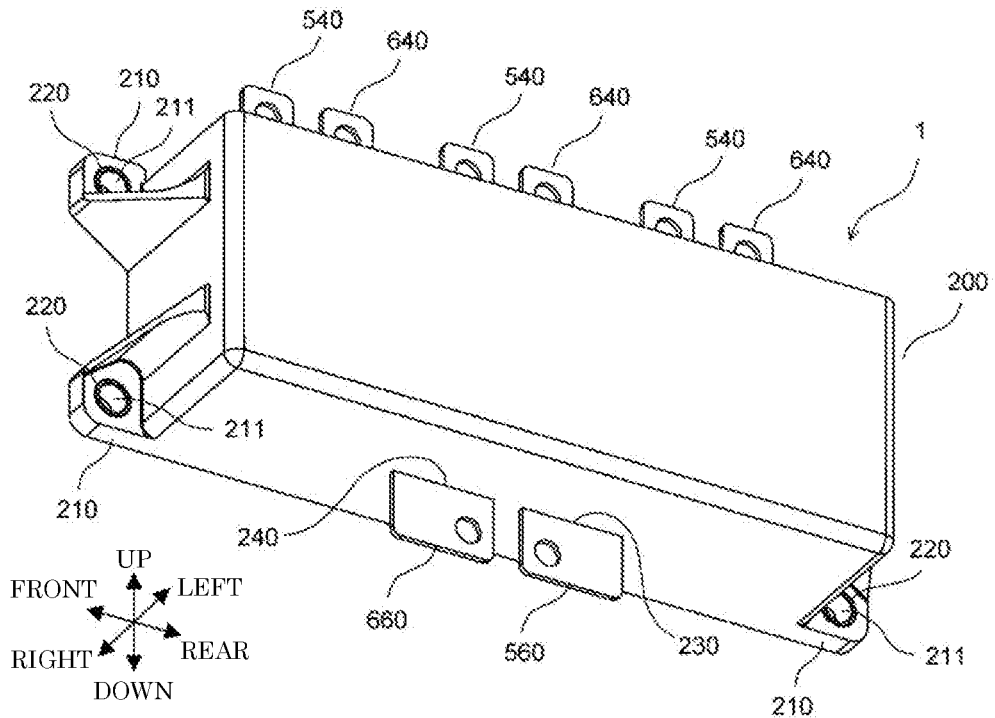
FIG. 1B is a perspective view illustrating the film capacitor according to the exemplary embodiment as viewed from the lower front.

FIG. 1A is a perspective view illustrating film capacitor 1 according to the present exemplary embodiment as viewed from the upper front, and FIG. 1B is a perspective view illustrating film capacitor 1 according to the present exemplary embodiment as viewed from the lower front.

As shown in FIGS. 1A and 1B, film capacitor 1 includes capacitor element unit 100, case 200 housing capacitor element unit 100, and filling resin 300 filled in case 200.

Filling resin 300 is a thermosetting resin such as an epoxy resin, is injected in a molten state into case 200 housing capacitor element unit 100, and is then cured by heating filling resin 300 in case 200. Most of capacitor element unit 100 buried in filling resin 300 is protected from moisture and impact.

Three first upper connection terminal parts 540 and three second upper connection terminal parts 640 in capacitor element unit 100 are led out through opening 200a at the top of case 200 to the outside. First upper connection terminal parts 540 and second upper connection terminal parts 640 are arranged in the left-right direction so that each of first upper connection terminal parts 540 and each of second upper connection terminal parts 640 are adjacent to each other. Further, first lower connection terminal part 560 and second lower connection terminal part 660 are respectively led out through first through-hole 230 and second through-hole 240, which are on a bottom surface of case 200, to the outside.

Figure 2:
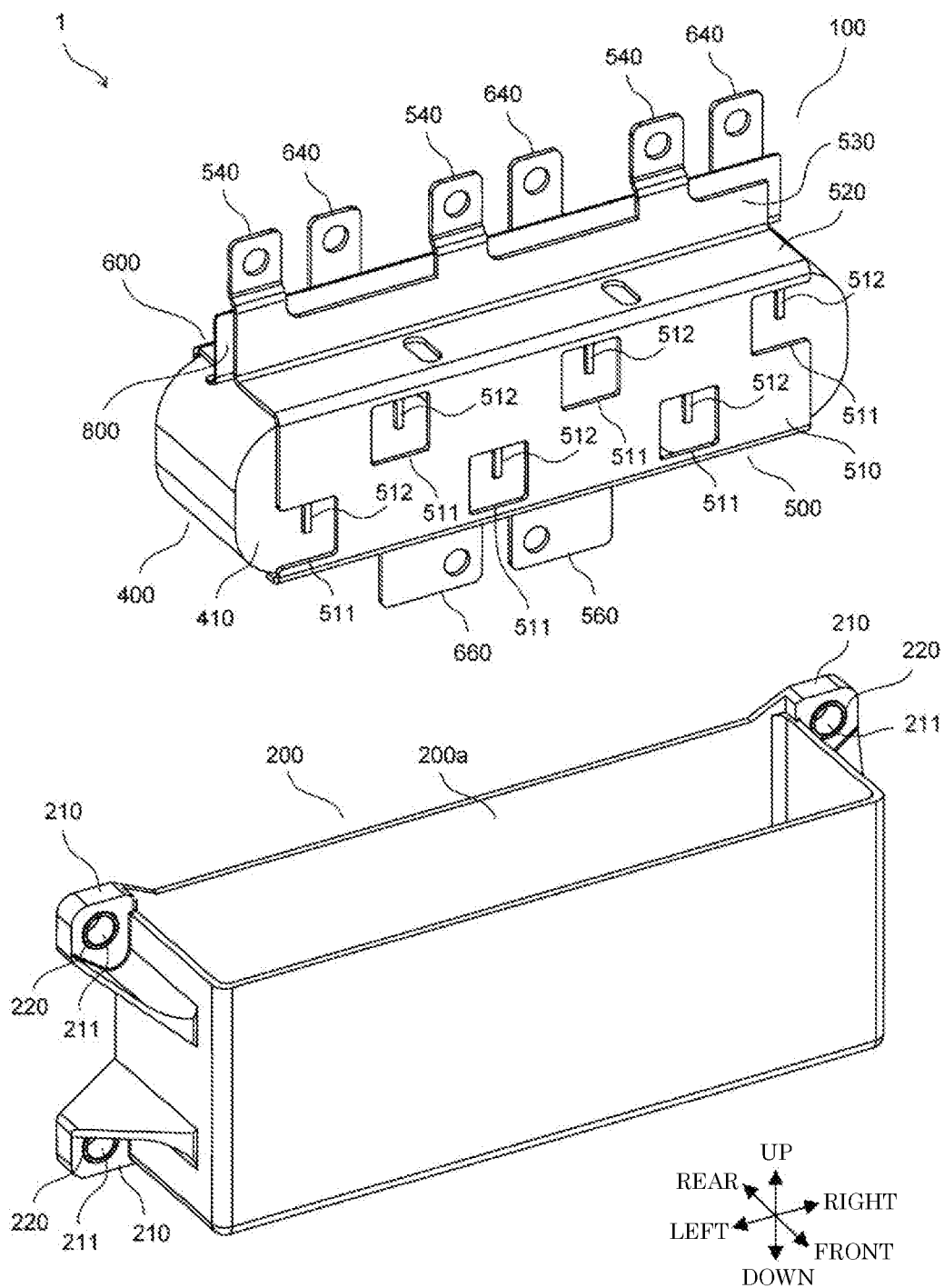
FIG. 2 is an exploded perspective view illustrating the film capacitor according to the exemplary embodiment as viewed from the upper front.
Figure 3:
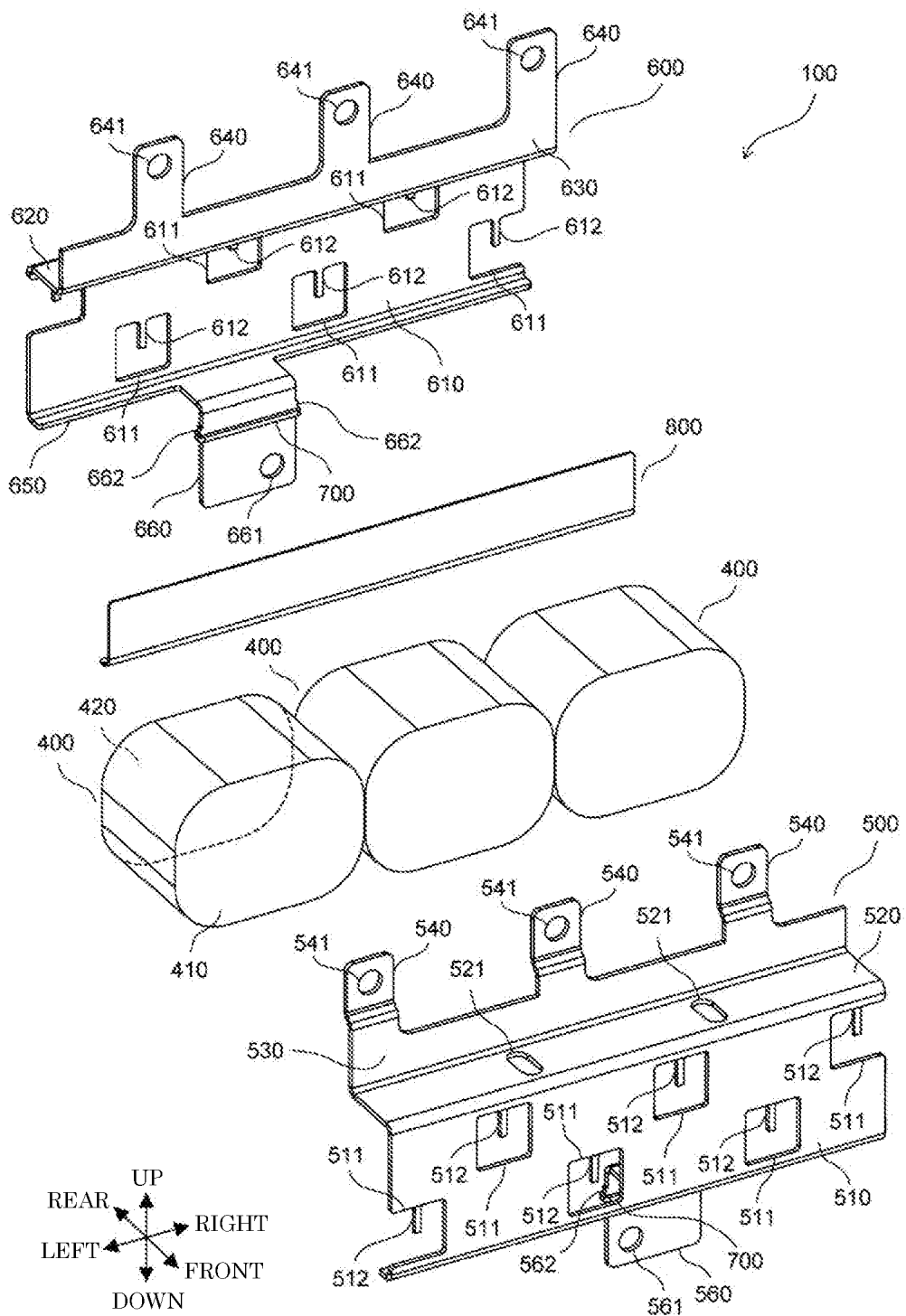
FIG. 3 is an exploded perspective view illustrating a capacitor element unit according to the exemplary embodiment as viewed from the upper front.
Figure 4A:
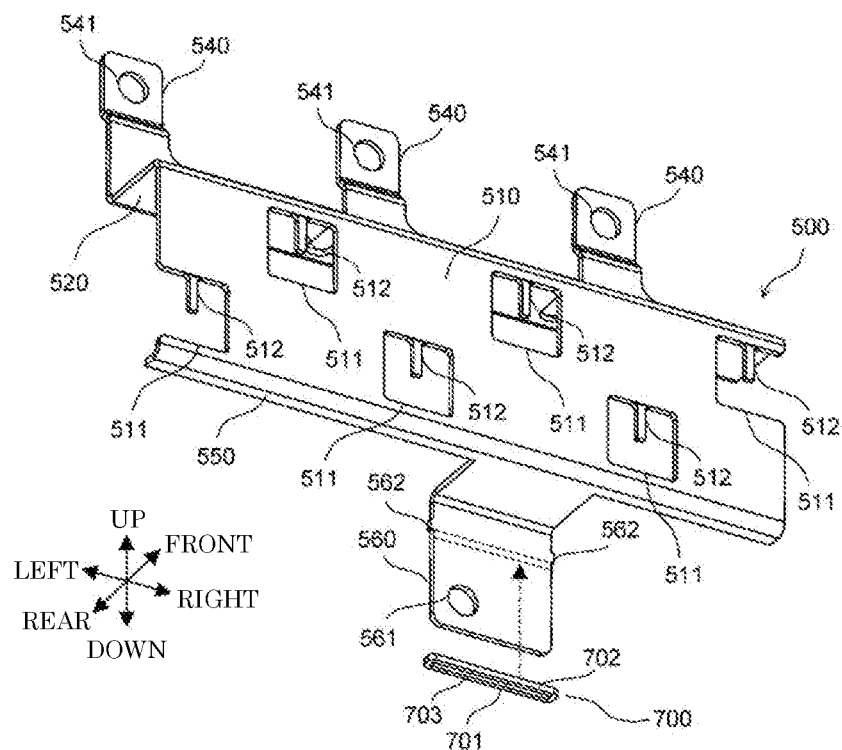
FIG. 4A is a perspective view illustrating a first busbar according to the present exemplary embodiment, from which a sealing member has been removed, as viewed from the lower front.
Figure 4B:
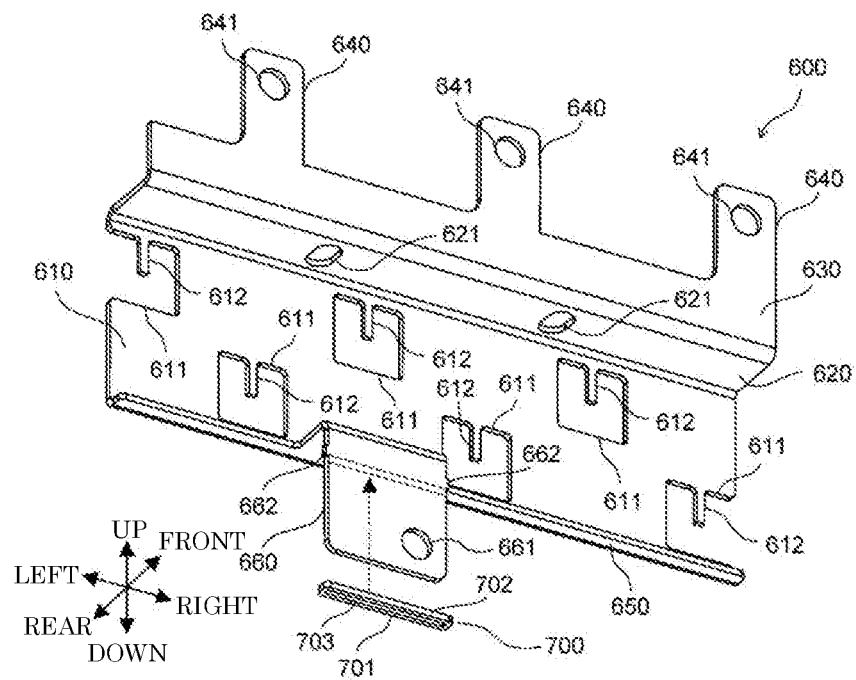
FIG. 4B is a perspective view illustrating a second busbar according to the present exemplary embodiment, from which the sealing member has been removed, as viewed from the lower front.

FIG. 2 is an exploded perspective view illustrating film capacitor 1 according to the present exemplary embodiment as viewed from the upper front. FIG. 3 is an exploded perspective view illustrating capacitor element unit 100 according to the present exemplary embodiment, as viewed from the upper front. FIG. 4A is a perspective view illustrating first busbar 500 according to the present exemplary embodiment, from which sealing member 700 has been removed, as viewed from the lower front, and FIG. 4B is a perspective view illustrating second busbar 600 according to the present exemplary embodiment, from which sealing member 700 has been removed, as viewed from the lower front.

With reference to FIGS. 2 to 4B, capacitor element unit 100 includes three capacitor elements 400, first busbar 500, second busbar 600, two sealing members 700, and insulating sheet 800.

Capacitor element 400 is formed by stacking two metallized films obtained by evaporating aluminum on a dielectric film, winding or laminating the stacked metallized films, and pressing them to be flat shape. In capacitor element 400, first end surface electrode 410 is formed on one end surface by spraying a metal such as zinc, and second end surface electrode 420 is formed on the other end surface by similarly spraying a metal such as zinc. Three capacitor elements 400 are arranged such that their peripheral surfaces face each other, and in this state, first busbar 500 and second busbar 600 are connected to these capacitor elements 400.

Note that capacitor element 400 of the present exemplary embodiment is formed of a metallized film obtained by evaporating aluminum on a dielectric film, but other than this, may be formed of a metallized film obtained by evaporating other metal such as zinc or magnesium. Alternatively, capacitor element 400 may be formed of a metallized film obtained by evaporating a plurality of metals among these metals, or may be formed of a metallized film obtained by evaporating an alloy of these metals.

First busbar 500 is made of a conductive material, for example, a copper plate, and includes first electrode terminal part 510, first upper relay portion 520, first overlap portion 530, first upper connection terminal part 540, first lower relay portion 550, and first lower connection terminal part 560. First busbar 500 is formed by, for example, appropriately cutting and bending one copper plate. Thus, first electrode terminal part 510, first upper relay portion 520, first overlap portion 530, first upper connection terminal part 540, first lower relay portion 550, and first lower connection terminal part 560 are integrated.

First electrode terminal part 510 has a substantially rectangular plate shape and covers first end surface electrode 410 of each capacitor element 400. Six openings 511 are formed in first electrode terminal part 510 so as to be arranged in the left-right direction and the up-down direction. Two openings 511 among six openings 511 correspond to one capacitor element 400. Electrode pin 512 is formed at an upper edge of each of six openings 511.

First upper relay portion 520 relays between first electrode terminal part 510 and first overlap portion 530. First upper relay portion 520 has a substantially elongated rectangular plate shape, and extends rearward from an upper end edge of first electrode terminal part 510. In first upper relay portion 520, two oblong holes 521 for allowing filling resin 300 to flow are formed. First overlap portion 530 has a substantially elongated rectangular plate shape, and extends upward from a rear end edge of first upper relay portion 520.

Three first upper connection terminal parts 540 are formed at predetermined intervals on an upper edge portion of first overlap portion 530. Each of first upper connection terminal parts 540 slightly extends upward from the upper end edge of first overlap portion 530, and then is bent and slightly extends rearward, and is again bent and extends upward. Circular mounting hole 541 is formed in a tip portion of first upper connection terminal part 540.

First lower relay portion 550 relays between first electrode terminal part 510 and first lower connection terminal part 560. First lower relay portion 550 extends rearward from a lower end edge of first electrode terminal part 510. First lower relay portion 550 includes a front-side portion having a substantially elongated rectangular plate shape with the same width as first electrode terminal part 510, and a rear-side portion having a substantially rectangular plate shape with the same width as first lower connection terminal part 560.

First lower connection terminal part 560 extends downward from a rear end edge of first lower relay portion 550. Circular mounting hole 561 is formed in a tip portion of first lower connection terminal part 560. Further, in a base end portion of first lower connection terminal part 560, projection 562 projecting left at a left edge and projection 562 projecting right at a right edge are formed.

Second busbar 600 is made of a conductive material, for example, a copper plate, and includes second electrode terminal part 610, second upper relay portion 620, second overlap portion 630, second upper connection terminal part 640, second lower relay portion 650, and second lower connection terminal part 660. Second busbar 600 is formed, for example, by appropriately cutting and bending one copper plate. Thus, second electrode terminal part 610, second upper relay portion 620, second overlap portion 630, second upper connection terminal part 640, second lower relay portion 650, and second lower connection terminal part 660 are integrated.

Second busbar 600 has the same shape as first busbar 500 except that second upper connection terminal part 640 extends straight upward, which is different from first upper connection terminal part 540. Six openings 611 are formed in second electrode terminal part 610, and electrode pin 612 is formed on an upper edge of each of six openings 611. Further, two holes 621 for allowing filling resin 300 to flow are formed in second upper relay portion 620. Further, mounting hole 641 is formed in a tip portion of second upper connection terminal part 640. Further, mounting hole 661 is formed in a tip portion of second lower connection terminal part 660. In a base end portion of second lower connection terminal part 660, projections 662 at a left edge and a right edge are formed.

Each of two sealing members 700 is made of a material having a lower elastic modulus than the material of case 200 and having a heat resistance higher than a curing temperature of filling resin 300, for example, a rubber material such as ethylene propylene diene rubber (EPDM), fluoro rubber (FKM), or the like, and has a circular ring shape. Sealing member 700 has both (upper and lower) end surfaces 701, outer peripheral surface 702, and inner peripheral surface 703. The cross section of sealing member 700 in a plane parallel to a central axis of the circular ring shape of sealing member 700 has a square shape surrounded by straight sides corresponding to both end surfaces 701, outer peripheral surface 702, and inner peripheral surface 703, respectively. One of two sealing members 700 is stretched in left-right direction so as to correspond to the width of first lower connection terminal part 560 as shown in FIG. 4A. And then sealing member 700 is fitted to first lower connection terminal part 560 until abutting on projections 562, and surrounds first lower connection terminal part 560. Further, another one of two sealing members 700 is stretched in left-right direction so as to correspond to the width of second lower connection terminal part 660 as shown in FIG. 4B. And then sealing member 700 is fitted to second lower connection terminal part 660 until abutting on projections 662, and surrounds second lower connection terminal part 660. One of sealing members 700 contracts so that inner peripheral surface 703 of sealing member 700 attaches to a peripheral surface of first lower connection terminal part 560. Further, another one of two sealing members 700 contracts so that inner peripheral surface 703 attaches to a peripheral surface of second lower connection terminal part 660.

Insulating sheet 800 is made of insulating paper or a resin material having electrical insulation property such as acrylic or silicon. Insulating sheet 800 has a substantially elongated rectangular shape, like first overlap portion 530 and second overlap portion 630, and has a slightly larger size than first overlap portion 530 and second overlap portion 630.

First busbar 500 is electrically connected to first end surface electrode 410 by joining each electrode pin 512 of first electrode terminal part 510 to first end surface electrode 410 of each capacitor element 400 by a joining method such as soldering. Further, second busbar 600 is electrically connected to second end surface electrode 420 by joining each electrode pin 612 of second electrode terminal part 610 to second end surface electrode 420 of each capacitor element 400 by a joining method such as soldering. Three capacitor elements 400, first busbar 500, and second busbar 600 are connected by soldering or the like, and capacitor element unit 100 is assembled (see FIG. 2).

In a state where capacitor element unit 100 is assembled, first overlap portion 530 of first busbar 500 and second overlap portion 630 of second busbar 600 overlap in the front-rear direction. Due to the overlapping of first overlap portion 530 and second overlap portion 630, a reduction in ESL (equivalent series inductance) in capacitor element unit 100 is expected. Insulating sheet 800 is sandwiched between first overlap portion 530 and second overlap portion 630 so that first overlap portion 530 and second overlap portion 630 are electrically insulated by insulating sheet 800.

Figure 5A:
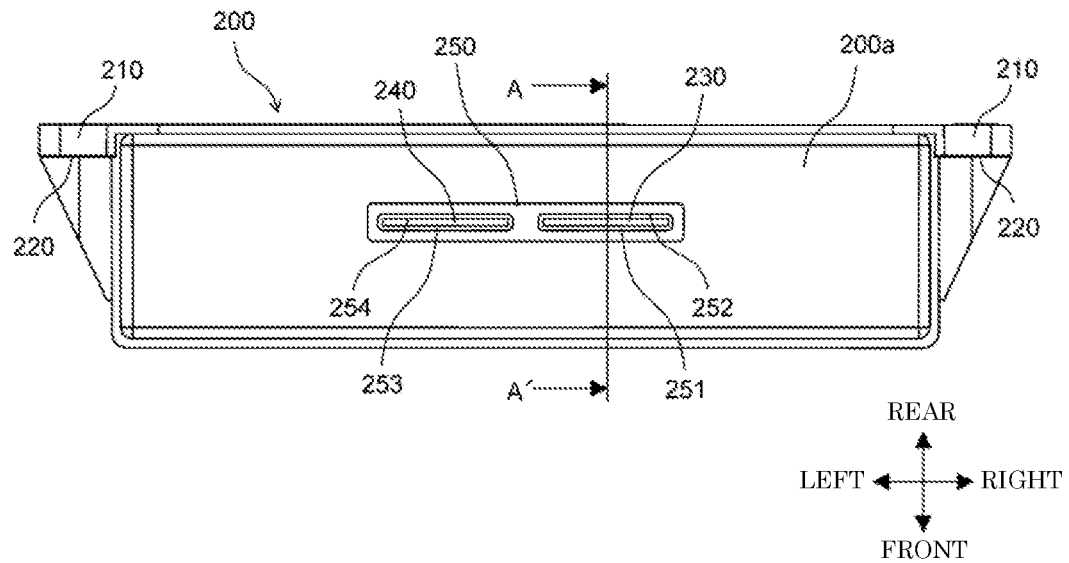
FIG. 5A is a plan view illustrating a case according to the exemplary embodiment.
Figure 5B:
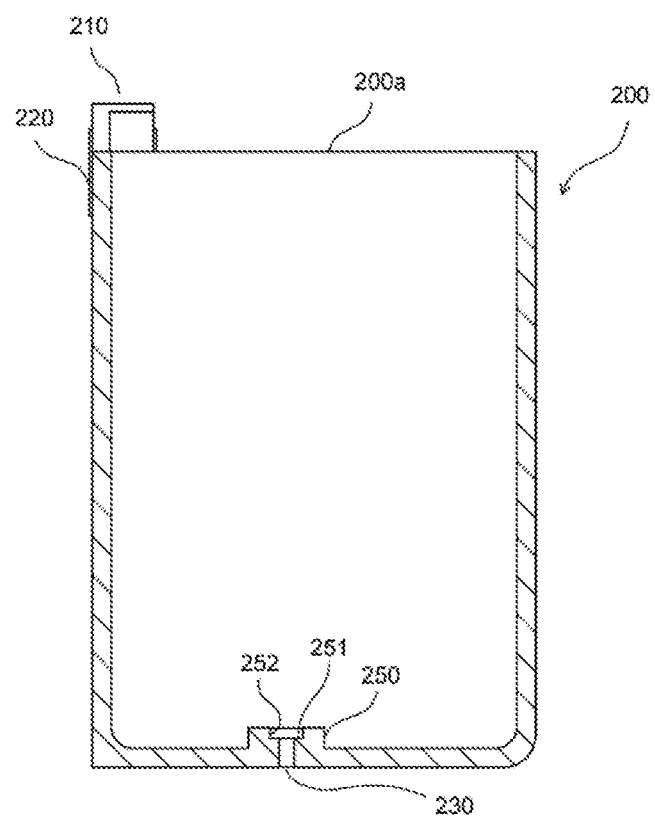
FIG. 5B is a cross-sectional view taken along line A-A' of FIG. 5A.

FIG. 5A is a plan view illustrating case 200 according to the present exemplary embodiment, and FIG. 5B is a cross-sectional view taken along line A-A' of FIG. 5A.

With reference to FIG. 1A, FIG. 1B, FIG. 2, FIG. 5A, and FIG. 5B, case 200 is made of resin, for example, polyphenylene sulfide (PPS) which is a thermoplastic resin. Case 200 has a substantially rectangular parallelepiped box shape, and has an upper opening. On each of a left side outer wall surface and a right side outer wall surface of case 200, mounting tabs 210 are provided at an upper rear end and a lower rear end, respectively. Insertion hole 211 is formed in each of mounting tabs 210. Metal collar 220 is fitted into insertion hole 211 to increase the strength of the hole. When film capacitor 1 is installed on an installation part of, for example, an external device, these mounting tabs 210 are fixed to the installation part by screws or the like.

First through-hole 230 and second through-hole 240 each having a slit shape are formed in a center portion of a bottom surface of case 200 so as to be aligned in the left-right direction. First through-hole 230 has a hole size slightly larger than a size of first lower connection terminal part 560 in the left-right direction, and second through-hole 240 has a hole size slightly larger than a size of second lower connection terminal part 660 in the left-right direction. Further, on the bottom surface of case 200, surrounding rib 250 that surrounds first through-hole 230 and second through-hole 240 is formed in an inner wall surface of case 200. Surrounding rib 250 has surrounding wall surface 252 which is an inner peripheral wall surrounding first through-hole 230 in plan view and rises from a periphery of region 251 surrounding first through-hole 230. Further, surrounding rib 250 also has surrounding wall surface 254 which is an inner peripheral wall surrounding second through-hole 240 in plan view and rises from a periphery of region 253 surrounding second through-hole 240.

Figure 6A:
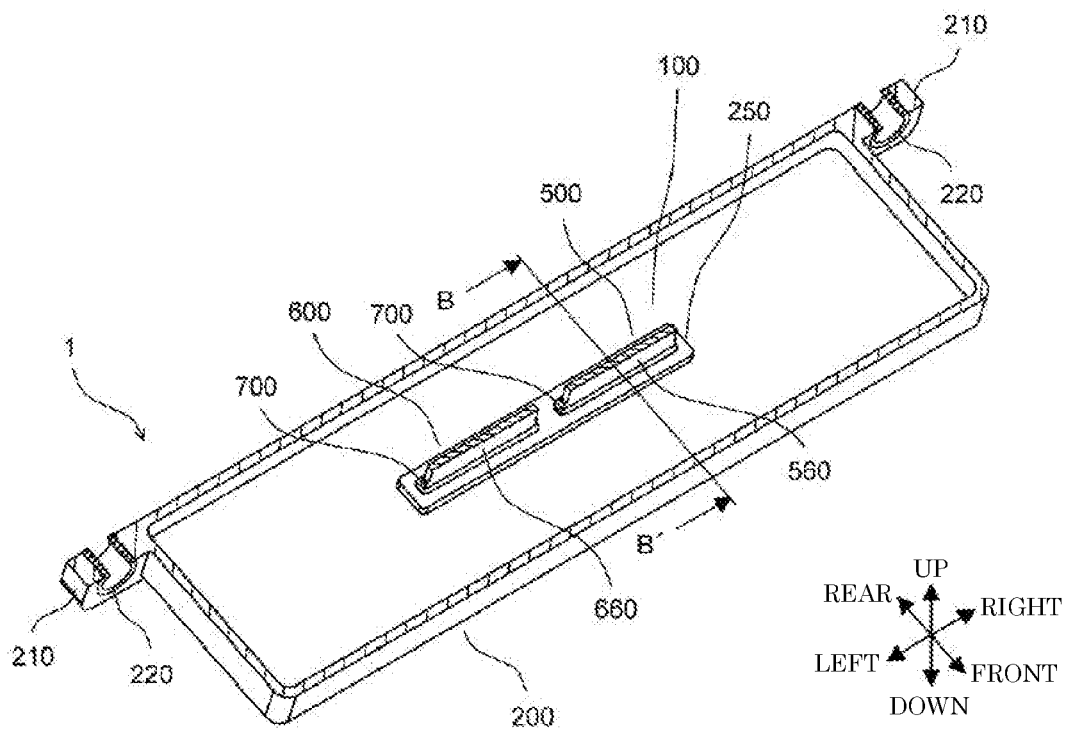
FIG. 6A is a cross-sectional view illustrating a lower portion of the case housing the capacitor element unit, cut in a plane perpendicular to an up-down direction, according to the exemplary embodiment.
Figure 6B:
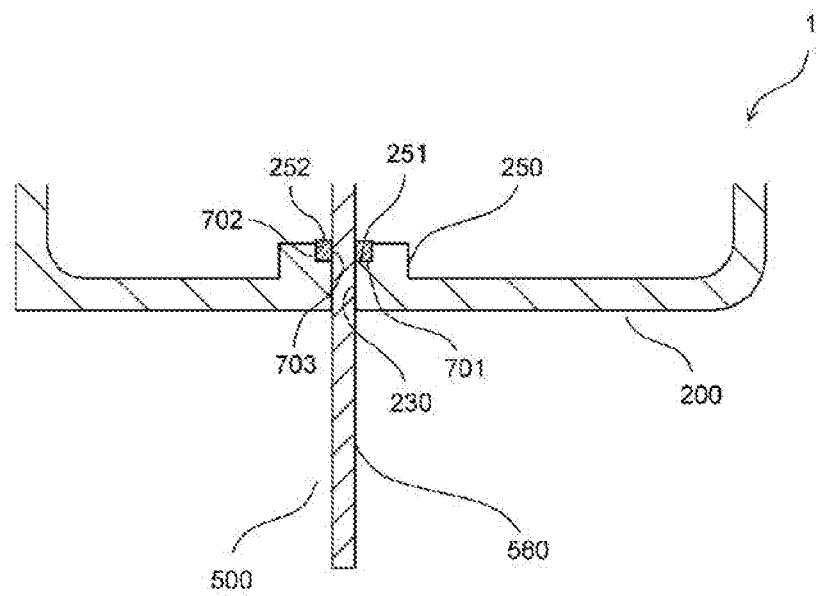
FIG. 6B is a cross-sectional view taken along line B-B' of FIG. 6A.

FIG. 6A is a cross-sectional view illustrating the lower portion of case 200 housing capacitor element unit 100 according to the present exemplary embodiment, which is cut in a plane perpendicular to the up-down direction, and FIG. 6B is a cross-sectional view taken along line B-B' of FIG. 6A.

Capacitor element unit 100 is housed in case 200 through opening 200a at the top of case 200. At this time, as shown in FIGS. 6A and 6B, first lower connection terminal part 560 of first busbar 500 is led out through first through-hole 230 to the outside. Further, sealing member 700 attached to first lower connection terminal part 560 is pressed into an inside region of surrounding wall surface 252 of surrounding rib 250. Lower end surface 701 of sealing member 700 abuts on region 251 surrounding first through-hole 230, and first through-hole 230 through which first lower connection terminal part 560 is passed is sealed from the inside of case 200. Entire outer peripheral surface 702 of sealing member 700 abuts on surrounding wall surface 252. Thus, inner peripheral surface 703 of sealing member 700 is strongly adhered to the peripheral surface of first lower connection terminal part 560 by being pushed by surrounding wall surface 252.

Similarly, second lower connection terminal part 660 of second busbar 600 is led out through second through-hole 240 to the outside. Further, sealing member 700 attached to second lower connection terminal part 660 is pressed into an inside region of surrounding wall surface 254 of surrounding rib 250. Lower end surface 701 of sealing member 700 abuts on region 253 surrounding second through-hole 240, and second through-hole 240 through which second lower connection terminal part 660 is passed is sealed from the inside of case 200. Entire outer peripheral surface 702 of sealing member 700 abuts on surrounding wall surface 254. Thus, inner peripheral surface 703 of sealing member 700 is strongly adhered to the peripheral surface of second lower connection terminal part 660 by being pushed by surrounding wall surface 254.

Liquid filling resin 300 is injected and stored in case 200 housing capacitor element unit 100. At this time, first through-hole 230 is sealed from the inside of case 200 by sealing member 700 attached to first lower connection terminal part 560, and second through-hole 240 is sealed from the inside of case 200 by sealing member 700 attached to second lower connection terminal part 660. As a result, liquid filling resin 300 is prevented from leaking to the outside of case 200 from a gap between first lower connection terminal part 560 and first through-hole 230 and a gap between second lower connection terminal part 660 and second through-hole 240.

In addition, the peripheral surface of first lower connection terminal part 560 is strongly adhered to inner peripheral surface 703 of sealing member 700, and the peripheral surface of second lower connection terminal part 660 is strongly adhered to inner peripheral surface 703 of sealing member 700. As a result, liquid filling resin 300 is prevented from passing through a gap between first lower connection terminal part 560 and sealing member 700 and a gap between second lower connection terminal part 660 and sealing member 700, and reaching first through-hole 230 and second through-hole 240. Hence, leakage of filling resin 300 to the outside of case 200 can be further prevented.

Further, outer peripheral surface 702 of sealing member 700 attached to first lower connection terminal part 560 abuts on surrounding wall surface 252 over the entire periphery, and outer peripheral surface 702 of sealing member 700 attached to second lower connection terminal part 660 abuts on surrounding wall surface 254 over the entire periphery. As a result, liquid filling resin 300 is hard to pass through a gap between outer peripheral surface 702 of sealing member 700 and surrounding wall surface 252, 254, and to enter an abutting portion between lower end surface 701 of sealing member 700 and region 251, 253. Hence, the leakage of filling resin 300 to the outside of case 200 can be further prevented.

In order to cure filling resin 300 stored in case 200, the inside of case 200 is heated. At this time, stress may be applied to each of sealing members 700 due to a difference in thermal expansion coefficient between case 200 made of resin and each of first busbar 500 and second busbar 600 made of metal. However, it is possible to absorb this stress by elastic deformation of sealing member 700. Thus, damage of sealing member 700 due to stress is prevented, and leakage of filling resin 300 from first through-hole 230 and second through-hole 240 due to the damage of sealing member 700 does not easily occur.

When filling resin 300 stored in case 200 is cured, film capacitor 1 is completed.

Film capacitor 1 is mounted on an external device or the like. A pair of external terminals (not shown) corresponding to these connection terminal parts 540, 640 provided in an external device or the like are connected to first upper connection terminal part 540 and second upper connection terminal part 640. Further, a pair of external terminals (not shown) corresponding to these connection terminal parts 560, 660 provided in an external device or the like are connected to first lower connection terminal part 560 and second lower connection terminal part 660.

In film capacitor 1, when power is supplied to each capacitor element 400, each capacitor element 400 may vibrate. At this time, the vibration of each capacitor element 400 propagates to first busbar 500 and second busbar 600, so that first lower connection terminal part 560 and second lower connection terminal part 660 may also vibrate. Since first lower connection terminal part 560 and second lower connection terminal part 660 are brought into contact with case 200 via sealing member 700 having a low elastic modulus, the vibration of first lower connection terminal part 560 and second lower connection terminal part 660 can be absorbed by sealing member 700, and propagation of the vibration to case 200 can be suppressed.

Effects of Exemplary Embodiment

As described above, according to the present exemplary embodiment, the following effects can be obtained.

When sealing member 700 attached to first lower connection terminal part 560 abuts on region 251 surrounding first through-hole 230, first through-hole 230 is sealed from the inside of case 200, and when sealing member 700 attached to second lower connection terminal part 660 abuts on region 253 surrounding second through-hole 240, second through-hole 240 is sealed from the inside of case 200. This can prevent liquid filling resin 300 from leaking to the outside of case 200 through the gap between first lower connection terminal part 560 and first through-hole 230 and the gap between second lower connection terminal part 660 and second through-hole 240. Further, the sealing operation can be easily performed by only making sealing member 700 abut on regions 251, 253. Furthermore, when stress is applied to each of sealing members 700 due to a difference in thermal expansion coefficient between case 200 and first busbar 500 as well as second busbar 600, this stress can be absorbed by elastic deformation of sealing member 700, and damage of sealing member 700 due to stress is prevented. Furthermore, even when capacitor element 400 vibrates during energization, and first lower connection terminal part 560 and second lower connection terminal part 660 vibrate due to propagation of this vibration, the vibration can be absorbed by sealing member 700, and propagation of the vibration to case 200 is suppressed.

In particular, when first through-hole 230 and second through-hole 240 are disposed on the bottom surface of case 200, filling resin 300 leaks more easily than when first through-hole 230 and second through-hole 240 are disposed on the front, rear, left and right side surfaces of case 200. In the present exemplary embodiment, first through-hole 230 and second through-hole 240 are disposed on the bottom surface of case 200, and first lower connection terminal part 560 and second lower connection terminal part 660 are led out from the bottom surface of case 200. Also in this case, since sealing member 700 can prevent filling resin 300 from leaking, the degree of freedom in the direction in which the connection terminal part is pulled out from case 200 to the outside can be increased.

Further, outer peripheral surface 702 of sealing member 700, which is attached to first lower connection terminal part 560, abuts on surrounding wall surface 252 over the entire periphery, so that inner peripheral surface 703 of sealing member 700 is strongly adhered to the peripheral surface of first lower connection terminal part 560. Outer peripheral surface 702 of sealing member 700, which is attached to second lower connection terminal part 660, abuts on surrounding wall surface 254 over the entire periphery, so that inner peripheral surface 703 of sealing member 700 is strongly adhered to the peripheral surface of second lower connection terminal part 660. As a result, liquid filling resin 300 is prevented from passing the gap between first lower connection terminal part 560 and sealing member 700 and the gap between second lower connection terminal part 660 and sealing member 700, and reaching first through-hole 230 and second through-hole 240. Hence, leakage of filling resin 300 to the outside of case 200 can be further prevented.

Furthermore, projections 562 provided on first lower connection terminal part 560 can restrict sealing member 700 from moving in a direction away from region 251 surrounding first through-hole 230, and projections 662 provided on second lower connection terminal part 660 can restrict sealing member 700 from moving in a direction away from region 253 surrounding second through-hole 240. Hence, sealing member 700 can be made to firmly abut on regions 251, 253, and leakage of filling resin 300 to the outside of case 200 can be further prevented.

Although the exemplary embodiment of the present disclosure has been described above, the present disclosure is not limited to the above-described exemplary embodiment, and various modifications of the application examples of the present disclosure other than the above-described exemplary embodiment are possible.

First Modified Example

Figure 7A:
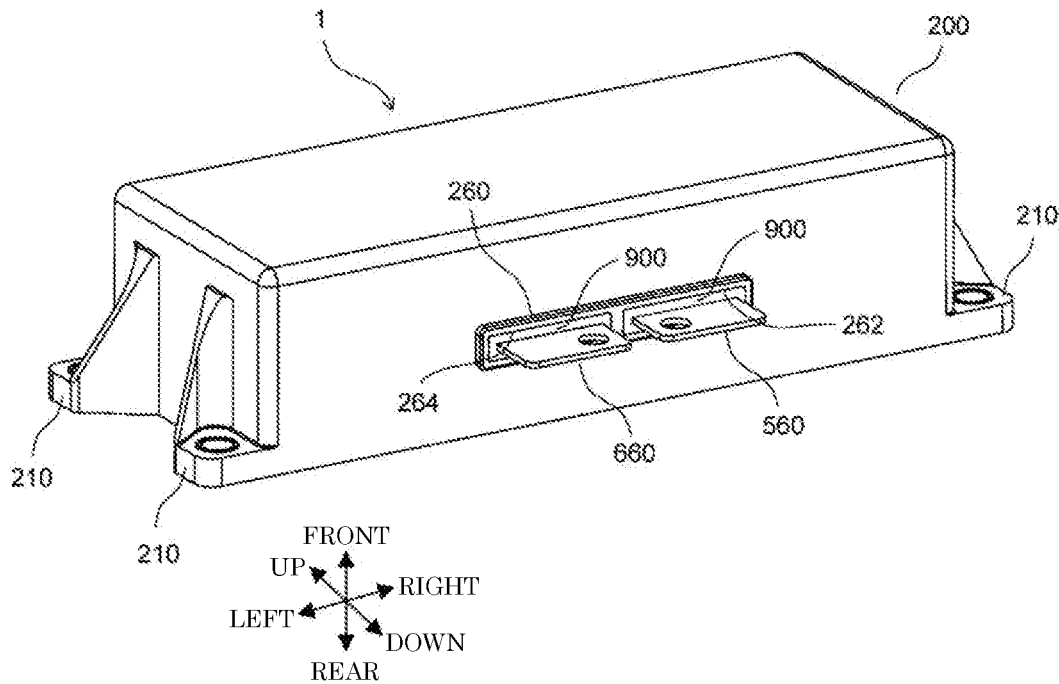
FIG. 7A is a perspective view illustrating the film capacitor according to a first modified example, with a bottom surface of the case facing forward.
Figure 7B:
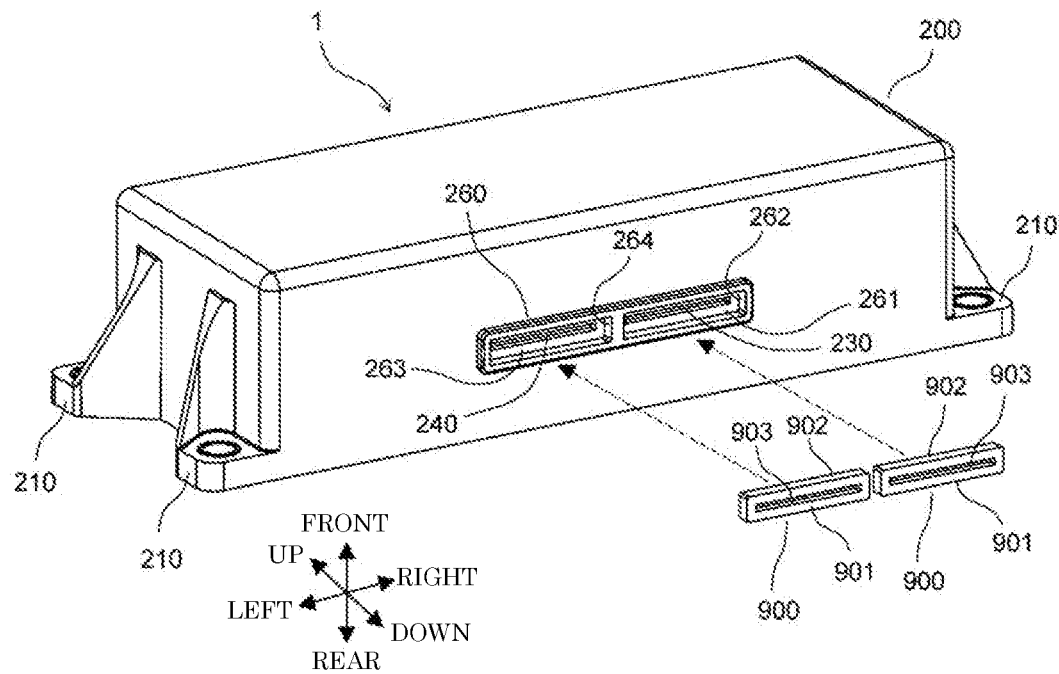
FIG. 7B is a perspective view illustrating the case with a bottom surface facing forward and a sealing member attached to the case according to the first modified example.

FIG. 7A is a perspective view illustrating film capacitor 1 according to a first modified example of the present exemplary embodiment, with the bottom surface of case 200 facing forward, and FIG. 7B is a perspective view illustrating case 200 with the bottom surface facing forward and sealing member 900 to be attached to case 200, according to the first modified example.

In the present modified example, sealing member 700 corresponds to a "first sealing member" described in the claims, and sealing member 900 corresponds to a "second sealing member" described in the claims. Surrounding wall surface 252, 254 corresponds to a "first surrounding wall surface" described in the claims, and surrounding wall surface 262, 264 corresponds to a "second surrounding wall surface" described in the claims.

In film capacitor 1 of the present modified example, in addition to surrounding rib 250 inside case 200, surrounding rib 260 surrounding first through-hole 230 and second through-hole 240 is provided in the outer wall surface on the bottom surface of case 200. In addition, film capacitor 1 of the present modified example includes two sealing members 900 in addition to two sealing members 700 that are respectively attached to first lower connection terminal part 560 and second lower connection terminal part 660 inside case 200.

Surrounding rib 260 has surrounding wall surface 262 which is an inner peripheral wall surrounding first through-hole 230 in plan view and rises from a periphery of region 261 surrounding first through-hole 230. Further, surrounding rib 260 also has surrounding wall surface 264 which is an inner peripheral wall surrounding second through-hole 240 in plan view and rises from a periphery of region 263 surrounding second through-hole 240.

Like sealing member 700, two sealing members 900 are made of a rubber material such as ethylene propylene diene rubber (EPDM) or fluoro rubber (FKM), and each have a circular ring shape. Sealing member 900 has both (upper and lower) end surfaces 901, outer peripheral surface 902, and inner peripheral surface 903. The cross section of sealing member 900 in a plane parallel to a central axis of the circular ring shape of sealing member 900 has a square shape surrounded by straight sides corresponding to both end surfaces 901, outer peripheral surface 902 and inner peripheral surface 903, respectively.

One of two sealing members 900 is stretched in the left-right direction so as to correspond to the width of first lower connection terminal part 560 as shown in FIG. 7B. And then sealing member 900 is fitted to first lower connection terminal part 560, which protrudes outside from first through-hole 230. And as shown in FIG. 7A, sealing member 900 is pressed into an inside region of surrounding wall surface 262 of surrounding rib 260. Upper end surface 901 of sealing member 900 abuts on region 261 surrounding first through-hole 230, and first through-hole 230 through which first lower connection terminal part 560 is passed is sealed from the outside of case 200. Outer peripheral surface 902 of sealing member 900 abuts on surrounding wall surface 262 over the entire periphery. Thus, inner peripheral surface 903 of sealing member 900 is strongly adhered to the peripheral surface of first lower connection terminal part 560 by being pushed by surrounding wall surface 262.

Similarly, another one of two sealing members 900 is stretched in the left-right direction so as to correspond to the width of second lower connection terminal part 660 as shown in FIG. 7B. And then sealing member 900 is fitted to second lower connection terminal part 660, which protrudes outside from second through-hole 240. And as shown in FIG. 7A, sealing member 900 is pressed into an inside region of surrounding wall surface 264 of surrounding rib 260. Upper end surface 901 of sealing member 900 abuts on region 263 surrounding second through-hole 240, and second through-hole 240 through which second lower connection terminal part 660 is passed is sealed from the outside of case 200. Outer peripheral surface 902 of sealing member 900 abuts on surrounding wall surface 264 over the entire periphery. Thus, inner peripheral surface 903 of sealing member 900 is strongly adhered to the peripheral surface of second lower connection terminal part 660 by being pushed by surrounding wall surface 264.

In the present modified example, first through-hole 230 is sealed from the outside of case 200 by sealing member 900 attached to first lower connection terminal part 560, and second through-hole 240 is sealed from the outside of case 200 by sealing member 900 attached to second lower connection terminal part 660. Thereby, on the outside of case 200, leakage of liquid filling resin 300 from the gap between first lower connection terminal part 560 and first through-hole 230 and the gap between second lower connection terminal part 660 and second through-hole 240 can be prevented.

Further, in the present modified example, the peripheral surface of first lower connection terminal part 560 is strongly adhered to inner peripheral surface 903 of sealing member 900, and the peripheral surface of second lower connection terminal part 660 is strongly adhered to inner peripheral surface 903 of sealing member 900. This makes it difficult for liquid filling resin 300 to pass through the gap between first lower connection terminal part 560 and sealing member 900 and the gap between second lower connection terminal part 660 and sealing member 900, so that on the outside of case 200, leakage of filling resin 300 to the outside of case 200 can be further prevented.

Further, in the present modified example, outer peripheral surface 902 of sealing member 900 attached to first lower connection terminal part 560 abuts on surrounding wall surface 262 over the entire periphery, and outer peripheral surface 902 of sealing member 900 attached to second lower connection terminal part 660 abuts on surrounding wall surface 264 over the entire periphery. This makes it difficult for liquid filling resin 300 to pass through the gap between outer peripheral surface 902 of sealing member 900 and surrounding wall surface 262 and the gap between outer peripheral surface 902 of sealing member 900 and surrounding wall surface 264 so that on the outside of case 200, the leakage of filling resin 300 to the outside of case 200 can be further prevented.

Other Modified Examples

In the above exemplary embodiment, outer peripheral surface 702 of sealing member 700 attached to first lower connection terminal part 560 abuts on surrounding wall surface 252 over the entire periphery, and outer peripheral surface 702 of sealing member 700 attached to second lower connection terminal part 660 abuts on surrounding wall surface 254 over the entire periphery.

Each of first lower connection terminal part 560 and second lower connection terminal part 660 has an extremely larger size in the width direction (left-right direction) than a size in the thickness direction (up-down direction). Thus, in the width direction, a gap between the peripheral surface of first lower connection terminal part 560 and inner peripheral surface 703 of sealing member 700 or a gap between the peripheral surface of second lower connection terminal part 660 and inner peripheral surface 703 of sealing member 700 is hard to be generated because inner peripheral surface 703 of sealing member 700 is likely to adhere to the peripheral surface of first lower connection terminal part 560 or second lower connection terminal part 660. On the other hand, in the thickness direction, a gap between the peripheral surface of first lower connection terminal part 560 and inner peripheral surface 703 of sealing member 700 or a gap between the peripheral surface of second lower connection terminal part 660 and inner peripheral surface 703 of sealing member 700 is easily generated because inner peripheral surface 703 of sealing member 700 are unlikely to adhere the peripheral surface of first lower connection terminal part 560 or second lower connection terminal part 660.

Figure 8:
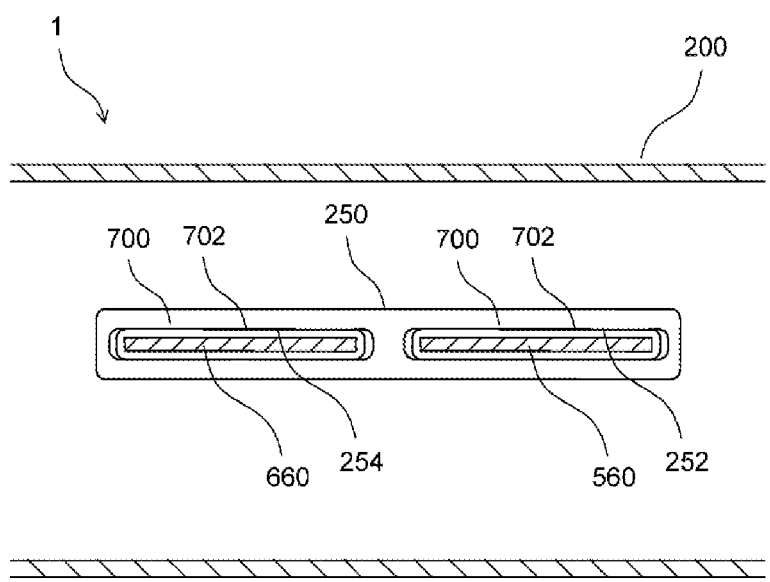
FIG. 8 is a view for explaining film capacitor 1 according to another modified example.

Accordingly, as shown in FIG. 8, a configuration around first lower connection terminal part 560 may be adopted in which outer peripheral surface 702 of sealing member 700 abuts on surrounding wall surface 252 in the thickness direction and does not abut on surrounding wall surface 252 in the width direction. Further, a configuration around second lower connection terminal part 660 may be adopted in which outer peripheral surface 702 of sealing member 700 abuts on surrounding wall surface 254 in the thickness direction and does not abut on surrounding wall surface 254 in the width direction.

With such a configuration, the peripheral surfaces of first lower connection terminal part 560 and second lower connection terminal part 660 and inner peripheral surface 703 of sealing member 700 can be firmly adhered in the thickness direction. In addition, since a gap is formed between outer peripheral surface 702 of sealing member 700 and surrounding wall surface 252, 254 in the width direction, sealing member 700 can be easily pressed into the inside region of surrounding wall surface 252, 254.

Similarly, also in the configuration of the first modified example, a configuration around first lower connection terminal part 560 may be adopted in which outer peripheral surface 902 of sealing member 900 abuts on surrounding wall surface 262 in the thickness direction and does not abut on surrounding wall surface 262 in the width direction. Further, a configuration around second lower connection terminal part 660 may be adopted in which outer peripheral surface 902 of sealing member 900 abuts on surrounding wall surface 264 in the thickness direction and does not abut on surrounding wall surface 264 in the width direction.

Further, in the above exemplary embodiment, first through-hole 230 and second through-hole 240 are disposed on the bottom surface of case 200, but first through-hole 230 and second through-hole 240 may be disposed on any of the front, rear, left, and right surfaces of case 200.

Further, in the above exemplary embodiment, by projections 562, 662 provided on first lower connection terminal part 560 and second lower connection terminal part 660, sealing member 700 is restricted from moving in a direction away from regions 251, 253 surrounding first through-hole 230 and second through-hole 240. Meanwhile, sealing member 700 may be fixed to first lower connection terminal part 560 and second lower connection terminal part 660 by a predetermined fixing method. For example, inner peripheral surface 703 of sealing member 700 and the peripheral surfaces of first lower connection terminal part 560 and second lower connection terminal part 660 may be bonded with a double-sided tape.

Further, in the above exemplary embodiment, sealing member 700 is made of a rubber material. In the first modified example, sealing member 900 is also made of a rubber material. Meanwhile, as the material of sealing member 700, 900, a rubber material is most preferable, but as the material of sealing member 700, 900, a resin material having a lower elastic modulus than the material of case 200 and having a heat resistance higher than a curing temperature of filling resin 300 may be used. For example, when the material of case 200 is PPS, sealing member 700, 900 may be made of polypropylene (PP), nylon 66 (PA66), polytetrafluoroethylene (PTFE), or the like.

Further, in the above exemplary embodiment, sealing member 700 has a square cross section parallel to the central axis, so that end surface 701, outer peripheral surface 702, and inner peripheral surface 703 are formed to be flat in the central axis direction. Meanwhile, the shape of sealing member 700 is not limited to the shape of the above exemplary embodiment. For example, sealing member 700 may be formed such that the cross section is circular. In this case, sealing member 700 does not have flat end surface 701, outer peripheral surface 702, and inner peripheral surface 703. Similarly, sealing member 900 may be also formed such that the cross section is circular.

Further, in the above exemplary embodiment, three capacitor elements 400 are included in capacitor element unit 100. Meanwhile, the number of capacitor elements 400 can be changed as appropriate, including the case where the number is one.

Further, in the above exemplary embodiment, each of capacitor elements 400 is formed by stacking two metallized films obtained by evaporating aluminum on a dielectric film, and winding or laminating the stacked metallized films. Meanwhile, besides this, each of capacitor elements 400 may be formed by stacking a metallized film obtained by evaporating aluminum on both surfaces of a dielectric film and an insulating film, and winding or laminating this.

Further, in the above exemplary embodiment, film capacitor 1 has been described as an example of the capacitor of the present disclosure. Meanwhile, the present disclosure can also be applied to capacitors other than film capacitor 1.

In addition, various modifications can be made to the exemplary embodiment of the present disclosure as appropriate within the scope of the technical idea described in the claims.

In the description of the above exemplary embodiment, terms indicating directions such as "upper", "lower", and the like indicate relative directions that depend only on the relative positional relationship of the constituent members, and do not indicate absolute directions such as vertical direction and horizontal direction.

The present disclosure is useful for capacitors used in various electronic devices, electric devices, industrial devices, electric devices of vehicles, and the like.

What is claimed is:

1. A capacitor comprising:
a capacitor element;
a busbar connected to an electrode of the capacitor element;
a case housing the capacitor element; and
a filling resin filled in the case, wherein:
the case has a through-hole penetrating from an inner surface of the case to an outer surface of the case,
the busbar includes a connection terminal part led out through the through-hole to an outside of the case,
the capacitor further includes a first sealing member and a second sealing member,
the first sealing member and the second sealing member having a portion of the case disposed between the first sealing member and the second sealing member such that the first sealing member and the second sealing member are separated from each other,
each of the first sealing member and the second sealing member has a ring shape surrounding the connection terminal part and attaches to the connection terminal part,
the first sealing member abuts on a first region of the inner surface of the case to seal the through-hole, the first region surrounding the through-hole,
the second sealing member abuts on a second region of the outer surface of the case to seal the through-hole, the second region surrounding the through-hole,
the connection terminal part has a plate shape,
the case has a first surrounding wall surface and a second surrounding wall surface, the first surrounding wall surface rising from a periphery of the first region and surrounding the first sealing member, the second surrounding wall surface rising from a periphery of the second region and surrounding the second sealing member,
the first surrounding wall surface abuts on the first sealing member at least in a thickness direction of the connection terminal part, and
the second surrounding wall surface abuts on the second sealing member at least in the thickness direction of the connection terminal part.

2. The capacitor according to claim 1, wherein the connection terminal part has a projection that restricts a displacement of the first sealing member on the connection terminal part due to abutting of the first sealing member on the first region.

* * * * *